United States Patent [19]

Scott

[11] 4,240,646
[45] Dec. 23, 1980

[54] COMBINED DRUM-SET CARRIER AND PERFORMANCE PLATFORM

[76] Inventor: Donald C. Scott, 114 Baker Creek Rd., McMinnville, Oreg. 97128

[21] Appl. No.: 6,295

[22] Filed: Jan. 25, 1979

[51] Int. Cl.³ .............................................. B62B 3/02
[52] U.S. Cl. ......................................... 280/30; 16/34;
52/6; 52/69; 52/143; 220/7; 280/38; 296/10
[58] Field of Search ................. 280/30, 37, 38, 43.14,
280/43.24, 639; 16/34; 296/10, 26, 27; 84/327,
421, 453, DIG. 3; 190/18 A; 220/6, 7; 217/15;
52/6, 143, 69; 108/55.1

[56] References Cited

U.S. PATENT DOCUMENTS

| | | | |
|---|---|---|---|
| 1,058,837 | 4/1913 | Zikmund | 16/34 |
| 2,611,417 | 9/1952 | Henry | 280/30 X |
| 2,792,270 | 5/1957 | Anderson | 280/30 X |
| 3,096,677 | 7/1963 | Ryan | 84/421 |
| 3,514,030 | 5/1970 | Carroll | 217/15 X |
| 4,126,213 | 11/1978 | McDonald | 190/18 A |

Primary Examiner—Robert J. Spar
Assistant Examiner—Fred A. Silverberg
Attorney, Agent, or Firm—Kolisch, Hartwell & Dickinson

[57] ABSTRACT

Apparatus for use both as a platform for drum-set performances and as a carrier for such a set. The apparatus consists of a rectangular bottom section with two or more side members hinged thereto for raising to a vertical position or lowering to a horizontal position. Castors are attached to at least two of such side members so that when they are raised, the castors extend downward from the bottom section, and when lowered, the castors are retracted above the bottom section. With the side members raised, the drum-set can be placed upon the bottom section, and the entire unit rolled, or carried by provided handles. With the side members lowered, the drum-set can be placed upon the bottom section and side members, and the apparatus used as a performance platform.

3 Claims, 5 Drawing Figures

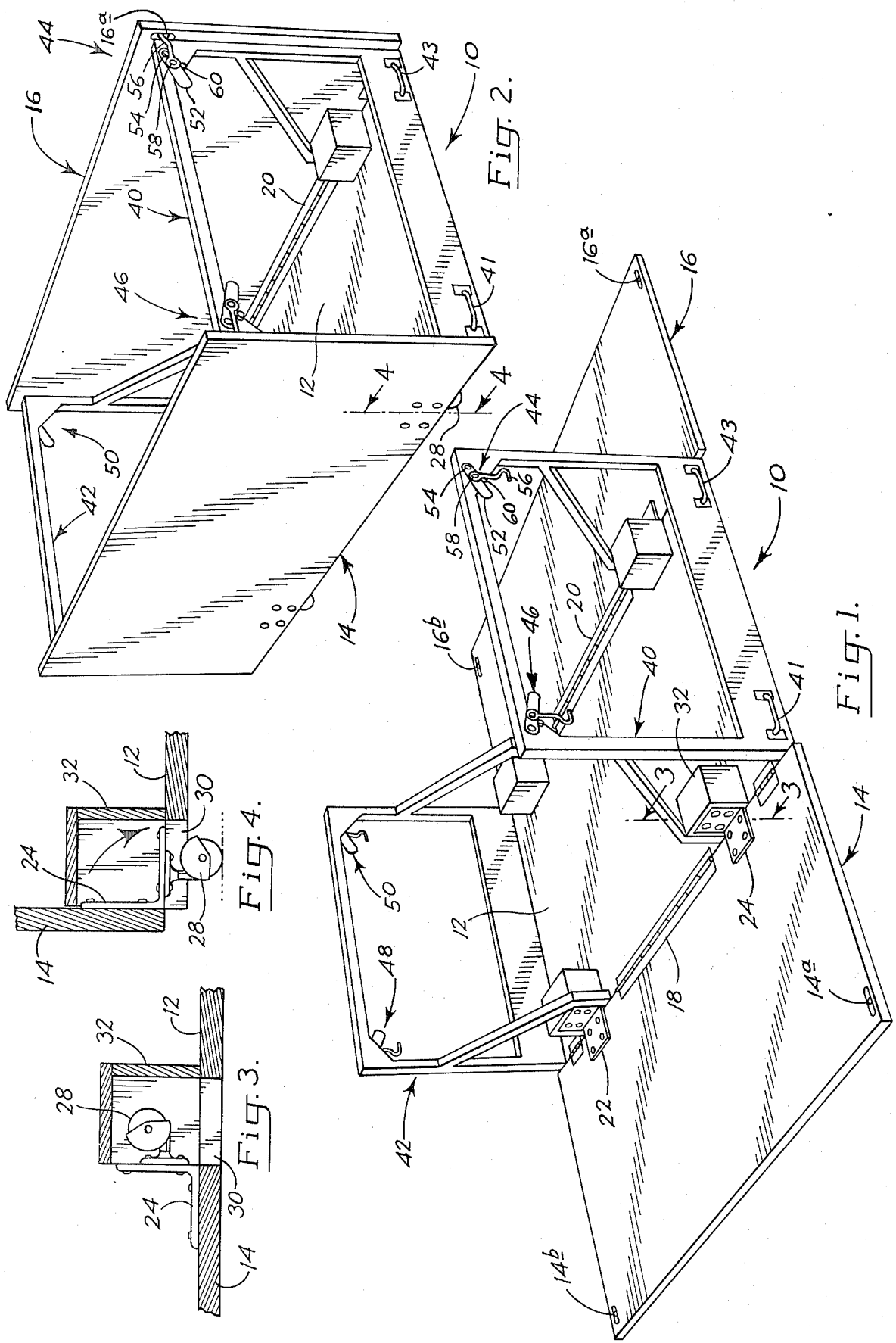

COMBINED DRUM-SET CARRIER AND PERFORMANCE PLATFORM

BACKGROUND AND SUMMARY OF THE INVENTION

This invention pertains to supports and carriers for musical instruments. More particularly, it pertains to a combined drum-set carrier and performance platform.

A typical drum-set contains a base drum, one or more tom-tom drums, a snare drum, one or more stands for cymbals, and a seat for the drummer. In the past, moving a drum-set from place to place for performances has entailed disassembling the set and transporting it to the new location piece by piece.

A general object of the present invention is to provide a unique means for handling a drum-set under both performance and transport conditions.

More particularly, an object of the invention is to provide a portable platform suitable for drum-set performances.

A further object is to provide such a platform which is adapted for easy movement of a supported assembled drum-set through rolling contact with the ground.

One form of the present invention includes a flat, rectangularly shaped bottom section having opposing side members which are each connected by hinges to the bottom section along its length. Two rectangular steel frames are mounted on and perpendicular to the bottom section, one being adjacent each end of the bottom section. Each frame spans the width of the bottom section and is of a suitable height to allow each side member to be attached releasably to the frame for the purpose of holding the member in a vertical position.

A notable feature of the invention is that there are provided castors which automatically extend as the side members are raised to enable the assembly so far described to be rolled easily when it is performing its function as a carrier. The invention as below disclosed utilizes four castors, each mounted on an associated bracket. There are two castors on each of two opposed side members, such being adjacent an end of the bottom section. Each bracket extends perpendicularly from a side member at the hinged edge, and the associated castor is mounted on the bracket so that when the side member is lowered, the rolling surfaces of the associated castors are directed toward the center of the bottom section. As each side member is raised, its castors and brackets therefor pivot through at 90° arc, with the castors passing through openings provided in the bottom section to allow the rolling contact castor surfaces to contact the ground.

When the opposing side members have been raised, each of the four castors is extended through its associated opening in the bottom section, and the entire structure is supported for transport.

These and other objects and advantages of the present invention will become more fully apparent when read in conjunction with the following detailed description and the drawings.

DESCRIPTION OF THE DRAWINGS

FIG. 1 is a perspective view of one embodiment of the invention with parts therein unfolded and in position for use as a performance platform.

FIG. 2 is a perspective view of the embodiment of FIG. 1 with the parts therein folded and in position for use as a drum-set carrier.

FIG. 3 is an enlarged, fragmentary cross-sectional view taken generally along line 3—3 in FIG. 1 showing a front castor well in the invention, with its associated castor retracted in the well.

FIG. 4 is similar to FIG. 3, except that it is taken generally along line 4—4 in FIG. 2, and shows the castor thereof lowered and exposed for rolling contact with the ground.

DETAILED DESCRIPTION OF THE INVENTION

1. Embodiment of Figs. 1-4, Inclusive

Figure 5:
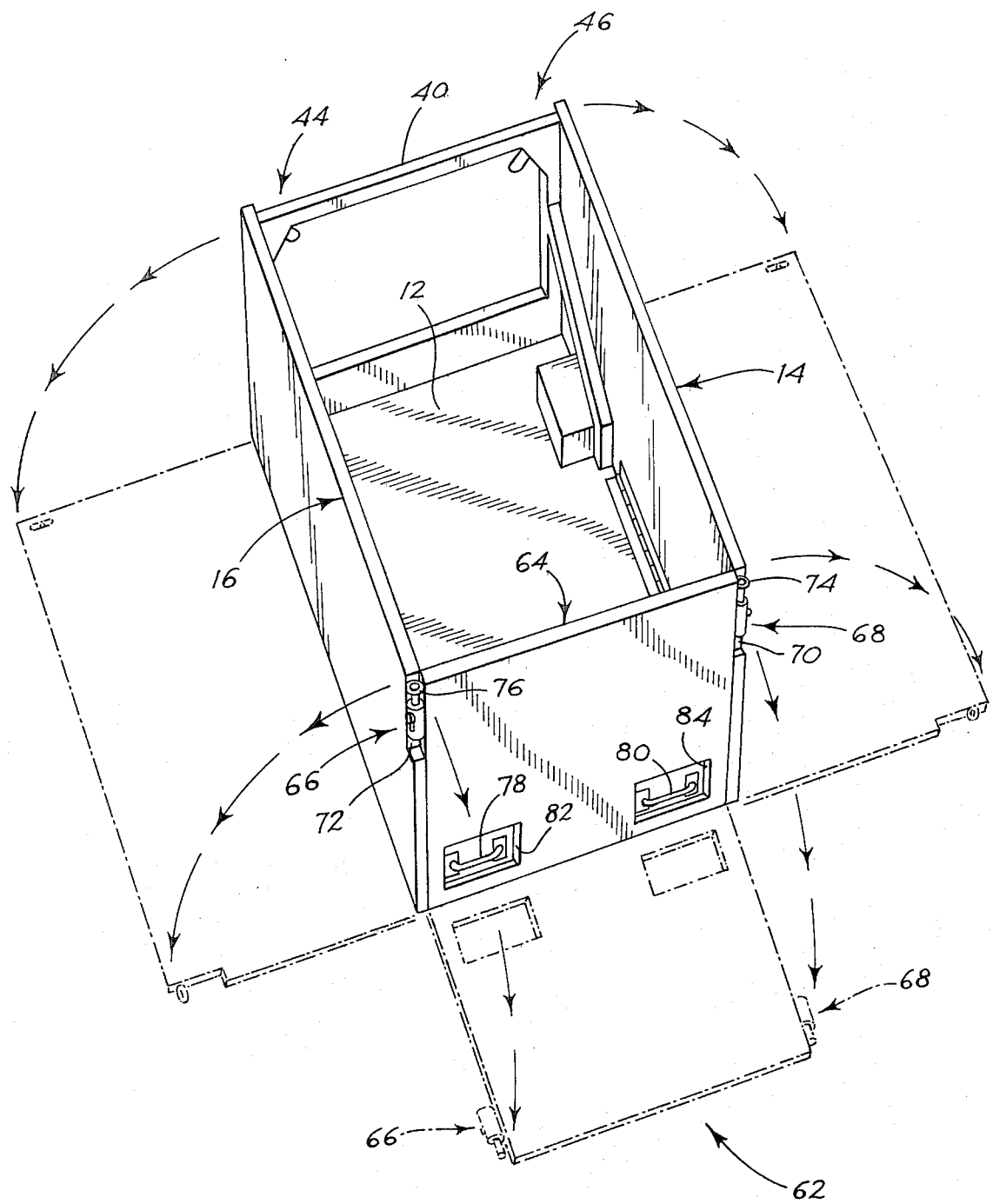
FIG. 5 illustrates in perspective another embodiment of the invention.

Turning now to the drawings, and referring first to FIGS. 1 and 2, shown at 10 is a preferred embodiment of the combined drum-set carrier and performance platform of the present invention. Included therein are three hinged-together, rectangular panels including a central panel, or bottom section, 12, and two side panels, or side members, 14, 16. Attaching panels 14,16 to the opposite edges of panel 12 are hinges 18, 20, respectively.

Mounted on each side member adjacent its junction with bottom section 12 are two angle brackets, such as brackets 22, 24 shown for member 14. Also mounted on the side members, in appropriate elongate, recessed slots, are transverse rods 14a, 14b. 16a, 16b.

Considering FIGS. 3 and 4 along with FIGS. 1 and 2, for an explanation of the several angle brackets and their associated structure, FIGS. 3 and 4 illustrate the construction associated with bracket 24. It might be noted at this point that the construction associated with each other angle bracket is substantially a duplicate of that associated with bracket 24.

Bracket 24 is fastened with one of its flanges flush with a surface as shown in panel 14, and with its other flange occupying a plane substantially aligned with the adjacent edge in panel 14. Suitably mounted on the latter-mentioned flange in the bracket is a conventional castor 28 which extends away from the outside of the flange. Affording clearance for castor 28, for a purpose which will become apparent shortly, is a generally rectangular notch 30 formed in the outside edge of bottom panel 12. Projecting upwardly from notch 30, and extending thereover, is a generally cubic housing 32 having, as can be seen, a top and three sides. Housing 32 is suitably secured to the top surface of panel 12.

With the apparatus of the invention having the configuration shown in FIG. 1, the position of castor 28 with respect to the underside panel 12 and the inside of housing 32 is shown in FIG. 3. More specifically, in this configuration, side panel 14 is substantially coplanar with bottom panel 12, and castor 28 is received and concealed within protective housing 32. With the apparatus having the configuration shown in FIG. 2, the position of castor 28 with respect to the bottom panel and housing 32 is as shown in FIG. 4. Here it will be noted that side panel 14 is substantially normal to bottom panel 12, and castor 28 projects below the underside of the bottom panel to contact the underlying floor surface.

Suitably mounted on angle bracket 22, and on the corresponding angle brackets on the opposite side of bottom panel 12, are castors like castor 28. Provided for each of these castors is clearance-affording notch, similar to notch 30, formed in panel 12, and a protective housing, like housing 32.

Returning attention particularly to FIGS. 1 and 2, provided for various purposes (to be explained) in the apparatus of the invention, are front and rear frames 40, 42, respectively.

Frame 40 is vertically mounted on bottom panel 12 adjacent the front thereof. Frame 42 is vertically mounted on panel 12 adjacent the rear thereof. Handles 41, 43 are mounted on frame 40 as shown. Similar handles (concealed) are likewise mounted on frame 42.

Provided in apparatus 10 at the upper corners of the two frames are four latch mechanisms shown generally at 44, 46 for frame 40, and at 48, 50 for frame 42. Each of these latch mechanisms is substantially the same in construction. Referring specifically to mechanism 44, it includes a securing bar 52 pivoted to frame 40 at 54, a hook 56 pivoted to bar 52 at 58, and a securing bar stop 60 anchored to the frame at the location shown.

Considering now how the apparatus of the invention as so far described operates, and referring to FIGS. 1-4, inclusive, when it is desired to use the same as a performance platform, the side panels are lowered to the positions shown in FIGS. 1 and 3. In these positions, the side panels cooperate with bottom panel 12 to form a deck that receives a drum set and a stool for the performer. In this condition, and as can be seen in FIG. 3 for castor 28, each of the four castors provided in the apparatus is received within its associated housing, and the undersides of panels 12, 14, 16 lie flush with the underlying floor surface.

When, on the other hand, it is desired to use the apparatus as a carrier/storage device for a drum set, the side panels are folded to the positions shown in FIGS. 2 and 4. A special feature of the invention is that with such folding of the side panels, the castors carried thereby rock downwardly through the notches, such as notch 30, in the bottom panel to positions like that shown for castor 28 in FIG. 4. Such action, obviously, places the castors in rolling contact with the underlying floor surface, and simultaneously lifts the underside of bottom panel 12 above such surface.

With the side panels so raised, the four latch mechanisms are used to secure these panels in upright positions. More specifically, and with reference to the operation of mechanism 44, with panel 16 raised to the position shown for it in FIG. 2, securing bar 52 is swung clockwise from the position shown for it in FIG. 2 to extend hook 56 into the slot containing rod 16a. With hook 56 and rod 16a caught, bar 52 is swung counterclockwise toward the position shown for it in FIG. 2. It will be noted that with bar 52, hook 56, and pivot connections 54, 58 arranged as shown, mechanism 44 functions with what is known as "toggle" or "over-center" action.

Similar operations are, of course, performed with the other three latching mechanisms.

As has previously been noted, apparatus 10 is now in a condition to function as a storage/transport device for a drum set. Under this circumstance, frames 40, 42 provide the requisite structural rigidity. In its form as a storage/carrier for a drum set, the apparatus may be rolled over the ground on its supporting castors, or it may be lifted through handles such as handles 41, 43.

To return the apparatus for functioning as a performance platform, it is, of course, an extremely simple matter quickly to release the various latch mechanisms to permit lowering of the side panels.

2. Embodiment of FIG. 5

Turning now to FIG. 5, another embodiment of the invention is shown being viewed from the rear. The second proposed embodiment is essentially the same as that previously described, with modifications as follow: The rear frame is omitted, a rear side panel or wing has been added, rear handles have been mounted on wheel housings adjacent the rear end, and sping-loaded barrel bolts are used to secure the rear side panel to the lateral side panels when all of these panels are raised.

The numbers used to identify parts in the embodiment of FIG. 5 are the same as those used in the embodiment of FIGS. 1 and 2 with respect to parts which are common to each embodiment.

Located generally at 62 is the second proposed embodiment of the invention. Included therein are four hinged-together panels—side panels 14, 16, bottom panel 12, and rear panel, or rear wing 64. Rear panel 64 is attached to bottom panel 12 by a hinge (concealed) in much the same manner as side panels 14, 16.

Still looking at FIG. 5, mounted on the upper side edges of rear panel 64 are spring-loaded barrel bolts 66, 68. Bolts 66, 68 are urged upward by springs at the bottoms thereof.

Side panels 14, 16 contain cut-outs 70, 72, respectively, adjacent their upper rear corners. Located within each cutout is a bolt retainer 74, 76 attached to the edge of its associated side panel.

Mounted on the rear wheel housings (partially concealed) are handles 78, 80. Handle ports 82, 84 are rectangular openings in rear panel 64 opposite handles 78, 80.

With regard to the structure in FIG. 5 other than the above-described, it is substantially the same as described for the previous embodiment.

As in the previous embodiment, when side panels 14, 16 are raised, their associated castors extend downward and lift the bottom panel from the floor, and the embodiment is placed in condition to be used as a carrier. When side panels 14, 16 are raised, they are secured to frame 40 by latching mechanisms 44, 46 in a manner which has been previously described. When side panels 14, 16 are partially secured by latching mechanisms 44, 46, rear panel 64 is raised and secured.

As rear panel 64 is raised, bolts 66, 68 are depressed to clear bolt retainers 74, 76 in order for the rear panel to be placed in its fully raised position. When the rear panel is so placed, bolts 66, 68 are released and the springs acting thereon urge the bolts into retainers 74, 76, thus to secure panel 64 in its raised position.

When rear panel 64 is so raised and secured, handles 78, 80 extend toward the rear through handle ports 82, 84, respectively.

The embodiment of FIG. 5 is used much in the same manner as has been described for the previous embodiment. With all side panels raised and secured, the drumset equipment can be rolled on the castors or carried, utilizing the handles. With the panels in their lowered positions (see the dash-dot panel positions shown in FIG. 5) equipment can be brought out and set up in such a manner as to use the bottom, side and rear panels as a performance platform.

It is claimed and desired to secure by Letters Patent:

1. A combined carrier and performance platform comprising a bottom section in the form of a rigid panel which forms a central portion of said platform, a pair of side memebers each also in the form of a rigid panel attached to opposite sides of said bottom section for swinging between raised and lowered positions, wherein said members form sides for said carrier, and coplanar side portions for said platform, respectively, and roller support means rigidly connected directly to said side members for shifting between exposed and concealed conditions with shifting of said side members between their said raised and lowered positions, respectively, said roller support means when in its said exposed condition providing ground-contacting rolling support for said bottom section and side members.

2. The combined carrier and platform of claim 1, wherein said roller support means, in its said concealed condition, extends above the upper surface of said bottom section, and which further includes well means formed in said bottom section for receiving said roller support means under such circumstances.

3. The combined carrier and platform of claim 1 which further comprises a rear wing in the form of a rigid panel attached to said bottom section for swinging relative thereto between raised and lowered positions, wherein said wing forms a side for said carrier and a coplanar portion for said platform, respectively.

* * * * *